United States Patent [19]

Kimura

[11] 4,320,945
[45] Mar. 23, 1982

[54] APPARATUS FOR DRIVING SUB-MIRROR IN SINGLE LENS REFLEX CAMERA

[75] Inventor: Makoto Kimura, Tokyo, Japan

[73] Assignee: Nippon Kogaku K.K., Tokyo, Japan

[21] Appl. No.: 229,933

[22] Filed: Jan. 30, 1981

[30] Foreign Application Priority Data

Feb. 5, 1980 [JP] Japan .................................. 55-12682

[51] Int. Cl.³ ........................ G03B 7/08; G03B 19/12
[52] U.S. Cl. .................................... 354/23 R; 354/55; 354/56; 354/152
[58] Field of Search ................ 354/23 R, 56, 59, 152, 354/55

[56] References Cited

U.S. PATENT DOCUMENTS 3,332,331  7/1967  Mandler et al. ...................... 354/55
3,468,233  9/1969  Schmidt ................................ 354/55

*Primary Examiner*—Michael L. Gellner
*Attorney, Agent, or Firm*—Fitzpatrick, Cella, Harper & Scinto

[57] ABSTRACT

A single lens reflex camera comprising a main mirror and a sub-mirror is improved in respect of the mechanism for driving the sub-mirror. The improved sub-mirror driving mechanism is simple in structure and easy to make.

1 Claim, 7 Drawing Figures

APPARATUS FOR DRIVING SUB-MIRROR IN SINGLE LENS REFLEX CAMERA

BACKGROUND OF THE INVENTION

1. Field of the Invention

The present invention relates to the mirror unit in a single lens reflex camera of the type which comprises a main mirror and a sub-mirror disposed behind the main mirror. When the main mirror is in the position for observation in which the operator can observe the object image formed on the finder screen through the finder, the sub-mirror directs the light transmitted through the semi-transparent part of the main mirror to the photo receiving element contained in a photo meter circuit or focus detecting circuit. When the main mirror is retracted to the position out of the photographing light path, the sub-mirror covers the semi-transparent part of the main mirror to prevent invert incident light coming from the finder part. More particularly, the present invention relates to an apparatus for driving and controlling the above sub-mirror.

2. Description of the Prior Art

There has been proposed an improvement relating to the above described type of apparatus which is the subject of a pending Japanese Utility Model Application No. 154,074/1977 owned by the same assignee as of the present application. FIG. 7, shows the arrangement of an apparatus disclosed in said prior Japanese Utility Model Application.

In FIG. 7, a main mirror is designated by 101 and a sub-mirror by 103. The main mirror 101 is supported by a supporting member 102 one end of which is supported on the camera housing rotatably about an axis. The sub-mirror 103 is supported by a supporting member 103 which is in turn supported pivotally on the main mirror supporting member 102. The sub-mirror supporting member 104 has an elongate slot 104a in which a pin 105a, provided on the free end of a swing lever 105 is engaged. The swing lever 105 is, at its other end, connected to a pivot for rotation and is under the biasing force of a spring 106. When the sub-mirror 103 is in the position for observation, the pin 105a of the swing lever 105 is pressed against the left side wall surface of the elongate slot 104a under the action of the spring 106 so as to hold the sub-mirror 103 in contact with a sub-mirror positioning pin 107. When the main mirror 101 is turned up clockwise to the position for photographing, the pin 105a of the swing lever 105 turns over its pressing side from the left side wall surface to the right side wall surface of the elongate slot 104a during the swing motion of the lever 105 so that the direction in which the sub-mirror 103 is biased by the spring 106 is reversed. When the main mirror 101 is moved to its retracted position for photographing as suggested by the phantom line in FIG. 7, the sub-mirror is brought into position to cover the semi-transparent part of the main mirror. This position of the sub-mirror is also suggested in phantom line. The sub-mirror is moved to this position by the biasing force of the spring 106 transmitted through the pin 105a which is pressing the right side wall surface of the slot 104a at that time.

As readily understood from the above, in the arrangement of FIG. 7, the biasing force of the spring 106 is transmitted to the sub-mirror 103 through the swing lever 105, the pin 105a thereon and the elongate slot 104a in which the pin is engaged. This arrangement is complicated in structure and requires an extremely high accuracy in machining the parts of the apparatus. Without such high precision there is assured no correct interlocking motion of the main and sub mirrors 101 and 103. This requirement of very high precision has resulted in low productivity which constitutes an important disadvantage of the prior art apparatus.

SUMMARY OF THE INVENTION

Accordingly, it is a general object of the invention to eliminate the above disadvantage.

It is a more specific object of the invention to provide a sub-mirror driving apparatus which does not require such high precision in manufacture as the prior art apparatus does and therefore which can be manufactured relatively easily.

Other and further objects, features and advantages of the invention will appear more fully from the following description of preferred embodiment with reference to the accompanying drawings.

BRIEF DESCRIPTION OF THE DRAWINGS

FIGS. 2 to 5 illustrate the manner of operation of the apparatus wherein FIG. 2 shows the main and sub mirrors in the position for observation, FIGS. 3 and 4 do the same at different phases of movement and FIG. 5 shows the same in the position for photographing;

DESCRIPTION OF THE PREFERRED EMBODIMENTS

Figure 1:
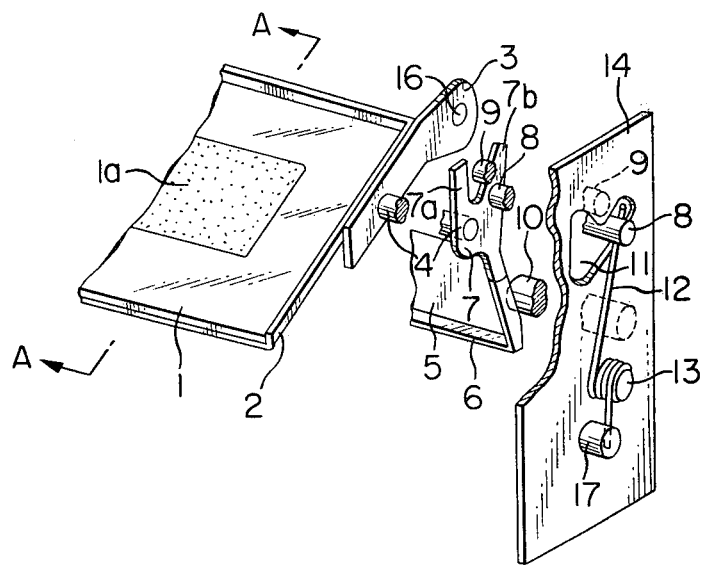
FIG. 1 is an exploded perspective view of a sub-mirror driving apparatus in the position for observation showing an embodiment of the invention.

Referring first to FIG. 1 showing a preferred embodiment of the invention, reference numeral 1 designates a main mirror for observation provided in a single lens reflex camera. A frame 2 holds the main mirror 1 and a lever 3 drives the frame 2 fixed thereto. To this end, the lever 3 is mounted rotatably about a pivot pin 16 fixed on the camera housing (not shown). The main mirror 1 has a semi-transparent part 1a formed therein.

Designated by 5 is a sub-mirror for receiving the light transmitted through the semi-transparent part 1a of the main mirror. A frame 6 holds the sub-mirror and a lever 7 drives the sub-mirror holding frame 6. Like the lever 3 for the main mirror, the lever 7 and the frame 6 are joined together. The lever 3 has a pin 4 fixed thereon and the lever 7 for the sub-mirror is mounted on the pin 4 rotatably about it. The lever 7 is divergent into two branches 7a and 7b to form a two tined-fork portion for the purpose of changing the direction of the action of a spring 12 of which a detailed description will be made hereinafter. Disposed between the two branches 7a and 7b is a pin 9 extending from one side wall 14 of the camera housing. In the position for observation shown in FIG. 2, the pin 9 is spaced apart from the two branches 7a and 7b by a determined distance. The side wall 14 has a heartshaped opening 11 formed therein. The lever 7 has a pin 8 which passes through the opening 11. Designated by 10 is a position pin for positioning the sub-mirror 5. The pin 10 is fixed to the side wall 14. The side wall 14 has further pins 13 and 17 on the other surface. The above mentioned spring 12 is coiled around the pin 13 and one of the spring 12 extends to the pin 17 on the side wall. The other end of the spring 12 extends to the above mentioned pin 8. The distance between pins 8 and 13 measures sufficiently large enough to eliminate any possible irregularity of biasing force of the spring 12 applied to the pin 8 caused by irregularity in accuracy among many products.

Figure 2:
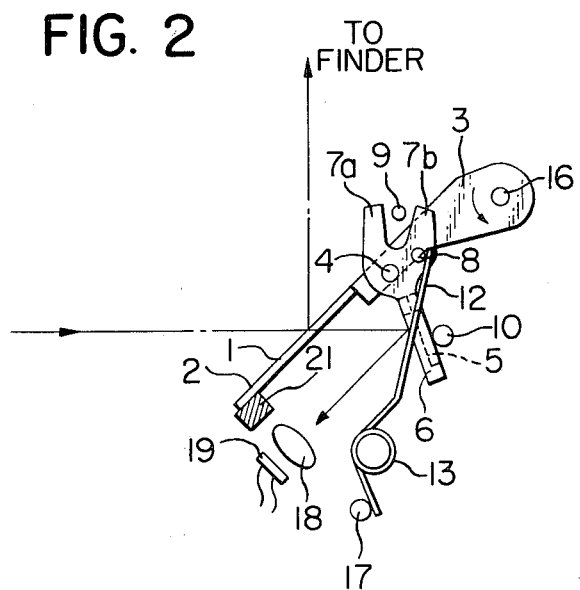

The manner of operation of the sub-mirror driving apparatus described above is as follows:

In the position for observation shown in FIGS. 1 and 2, the main mirror 1 is in contact with a position pin 21 (FIG. 2) and the sub-mirror 5 is in contact with the position pin 10 under the force of spring 12. In this position, therefore, the light transmitted through a photographing lens (not shown) is reflected by the main mirror 1 toward the finder optical system including a finder screen (not shown) and the operator can observe the reflected image of an object through the finder. At the same time, a portion of the photographing light passes through the semi-transparent part 1a of the main mirror 1 and is incident upon the sub-mirror 5 disposed behind the main mirror. The sub-mirror reflects the incident light toward the photo receiving element 19 through a condenser lens 18. The photo receiving element 19 is disposed on the bottom of the camera housing to measure the brightness of the object or the distance between the object and the camera.

To start a photographing action of the camera from the position for observation shown in FIG. 2, the operator pushes a shutter button (not shown) down. Thereby, the lever 3 is rotated about the axis 16 clockwise through a linking mechanism not shown. As the lever 3 is driven into clockwise rotation, the main mirror 1 is turned up. During the first step of the upward movement of the main mirror 1, the sub-mirror 5 remains held in the position in contact with the position pin 10. Since there is a space between the stationary pin 9 and the fork 7a, 7b of the lever 7, the pin 9 can not limit the movement of the lever 7 in this phase of the movement of the main mirror. Although the pin 4 moves upward together with the clockwise rotation of the main mirror about the pivot pin 16, the sub-mirror remains in contact with the position pin 10 by the counter-clockwise biasing force of the spring 12 through the pin 8.

Figure 3:
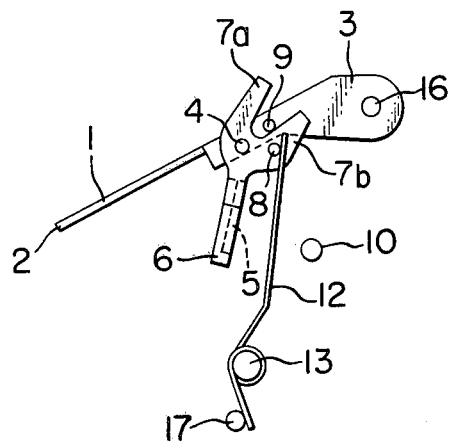

At the second step of the upward movement of the main mirror together with the pin 4, the branch 7b of the lever 7 comes into contact with the stationary pin 9 after a further clockwise rotation of the pin 4 about the axis 16, as shown in FIG. 3. In the position shown in FIG. 3, the pin 9 limits the movement of the lever 7. With some further upward movement of the main mirror 1 from the position shown in FIG. 3, therefore, the pin 9 applies a pressure to the branch 7b and the lever 7 begins rotating clockwise about the pin 4 on the lever 3 against the biasing force of the spring 12. Thus, the lever 7 moves apart from the position pin 10. As the lever 7 turns up clockwise about the pin 4 following the clockwise rotation of the main mirror 1, the pin 8 on the lever 7 also moves rotating about the pin 4. After some angle of clockwise rotation of the pin 8 in this course of movement, the spring 12 changes its biasing position relative to the lever 7. Namely, the direction in which the lever 7 is biased by the spring 12 is changed over from counter-clockwise rotation about pin 4 to clockwise rotation about pin 4. Therefore, at this time point, the lever 7 is rotated clockwise about the pin 4 in a moment up to the position shown in FIG. 4. In the position shown in FIG. 4, the branch 7a of the lever is in contact with the stationary pin 9 under the pressure applied by the spring 12.

At the third step of movement of the main mirror, the contact between the branch 7a and the pin 9 limits the movement of the lever 7 and therefore the sub-mirror 5 moves in such manner as to cover the semi-transparent part 1a of the main mirror 1. The sub-mirror is laid on the part 1a and the latter is closed by the former completely. After a further upward movement of the main mirror 1, the branch 7a of the lever 7 moves away from the pin 9 and therefore the limitation of movement imposed on the lever 7 by the stationary pin 9 is removed. At the time of this removal of limitation, the biasing force of the spring 12 brings the sub-mirror 5 to the position in which the sub-mirror 5 and the main mirror 1 overlap each other and the semi-transparent part 1a of the main mirror is tightly closed by the sub-mirror.

Figure 5:
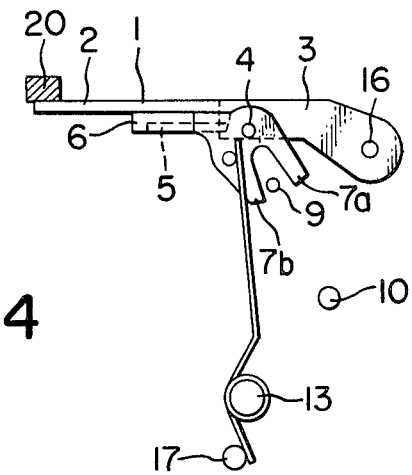

At the fourth step of upward movement of the main mirror 1, the sub-mirror 5 moves together with the main mirror while maintaining the above overlapped state. Finally, the main mirror 1 comes into contact with a stopper 20 which stops the upward movement of the main mirror. This position is shown in FIG. 5. In this position there is a determined distance between the stationary pin 9 and the fork 7a, 7b. Therefore, the spring 12 can exert its biasing force on the sub-mirror 5. The sub-mirror 5 is pressed against the back surface of the main mirror 1 and is firmly held in the position shown in FIG. 5. The sub-mirror 5 in this position serves to block the inverse incident light from entering the camera housing through the eyepiece and finder part (not shown). On the other hand, the light transmitted through the photographing lens (not shown) is allowed to directly run against the shutter curtains (not shown). In this manner, the main and sub mirrors 1 and 5 are retracted to the position out of the optical path for photographing light and the camera is ready for releasing the shutter.

Figure 4:
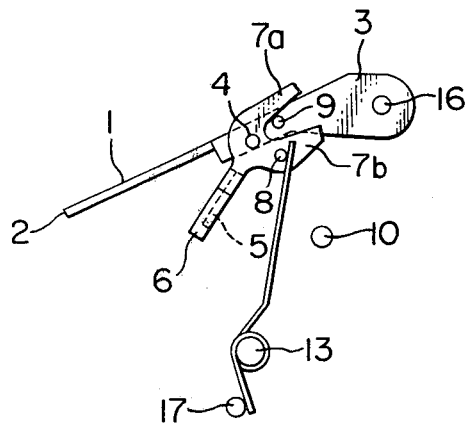

Now, the shutter is released. The opening curtain of the shutter runs and then the closing curtain runs in the manner known per se. Subsequent to the release of shutter, the main and sub mirrors 1 and 5 are returned to the position for observation shown in FIG. 3 from the retracted position for photographing shown in FIG. 6 by a linking mechanism not shown. This returning motion of the mirrors 1 and 5 proceeds in the following manner:

The lever 3 being driven by a mechanism not shown, the mirror 1 starts moving downward from the position shown in FIG. 5. At the initial stage of downward movement of the main mirror 1, since, as seen best from FIG. 6, there is a space between the stationary pin 9 and the fork 7a, 7b of the lever 7, the sub-mirror 5 also moves downward together with the main mirror 1. In this step of movement, the stationary pin 9 can not limit the movement of the lever 7 although the pin 4 moves together with the counter-clockwise rotation of the main mirror about the axis 16. The spring 12 keeps the mirrors 1 and 5 overlapped during the first step of downward movement. After a further downward movement, the branch 7a of the lever 7 comes into contact with the stationary pin 9. Therefore, the movement of the lever is then limited by the pin 9 and the lever 7 begins to rotate counter-clockwise about the pin 4 on the lever 3 against the force of the spring 12. Thus, the sub-mirror 5 moves away from the main mirror 1 as shown in FIG. 4.

After the mirror 1 has moved downward some further distance and the pin 8 has been rotated some angular distance counter-clockwise about the pin 4, the spring 12 suddenly changes the direction of its biasing force on the lever 7. Namely, at this point, the spring 12 intends to rotate the lever 7 counter-clockwise about the pin 4. As the result of this biasing force, the lever 7 is rotated counter-clockwise about the pin 4 in a moment during the course of downward movement of the main mirror 1. Thus, the lever 7 is brought into the position shown in FIG. 3. In this position, the branch 7b is in contact with the stationary pin 9 under the pressure applied by the spring 12. Since the branch 7b is pressed against the pin 9 by spring 12, the movement of the lever 7 is limited again by the stationary pin 9. With a further downward movement of the main mirror 1, the sub-mirror 5 comes into contact with the position pin 10. Now, the sub-mirror rotating counter-clockwise is limited by the position 10 instead of the stationary pin 9 during further downward movement of the main mirror 1. After a further downward movement of the main mirror 1, the branch 7b of the lever 7 is spaced apart from the stationary pin 9 and then the main mirror 1 reaches the position shown in FIG. 2. In this position, a mechanism not shown prevents the main mirror from further downward movement. Since the fork portion 7a, 7b of the lever 7 is disengaged from the pin 9, the spring 12 presses the lever against the position pin 10 and holds the sub-mirror 5 in the position shown in FIG. 2. By the way, the two branches 7a and 7b may be connected together to form a loop-like portion.

In the position shown in FIG. 2, the main mirror 1 is pressed against the position member 21 and held in the position for observation. The position member 21 serves also to absorb the shock caused by the downward movement of the main mirror 1 against the position member. In this manner, the main and sub-mirrors 1 and 5 are returned to the position for observation shown in FIG. 2 from the retracted position.

Figure 6:
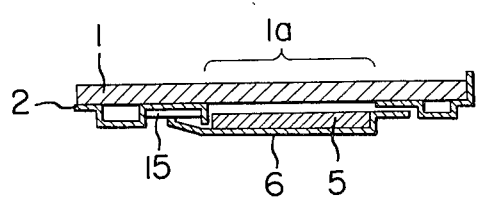
FIG. 6 is a sectional view taken along the line A—A in FIG. 1 showing the main and sub mirrors in the position for photographing.
Figure 7:
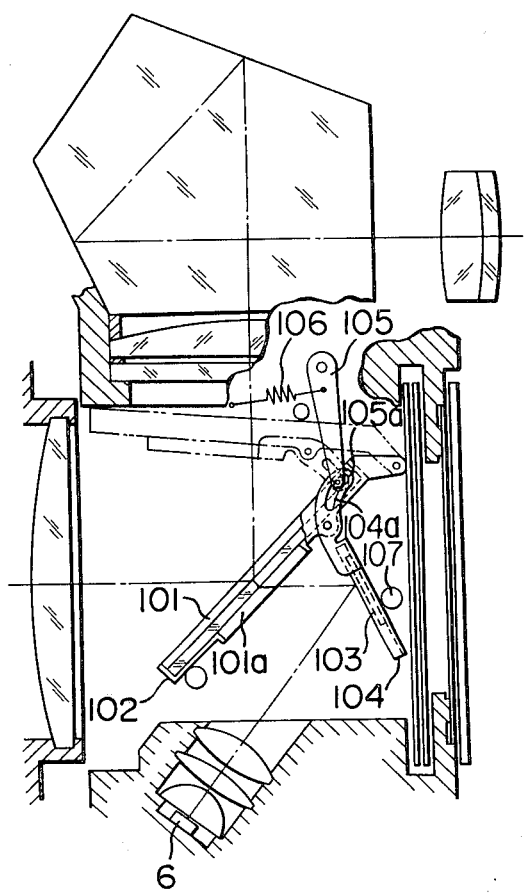
FIG. 7 schematically shows the prior art arrangement.

In the retracted position, the sub-mirror 5 closes the semi-transparent part 1a of the main mirror 1 in a manner as shown in FIG. 6.

As seen from FIG. 6, the frame member 2 for the main mirror 1 is not flat in cross-section but has some protrusions and retractions. The sub-mirror holding frame 6 also has some curved portions mating with the recessed portions of the main mirror holding frame 2. By shaping the frame members 2 and 6 in this manner, there is obtained a tight overlap of the semi-transparent part 1a and the sub-mirror 5 to perfectly prevent undesirable entrance of inverse incident light into the path of photographing light through the finder. Designated by 15 is a sponge-like member provided in the recessed portion of the main mirror holding frame 2. The function of the sponge-like member 15 is to prevent any light leakage through the gaps between the overlapped main and sub mirrors 1 and 5 as well as to absorb the shock applied to the main mirror when the sub-mirror holding frame 6 strikes upon the main mirror holding frame 2.

As understood from the foregoing, the present invention has a particular advantage over the prior art.

According to the invention, the sub-mirror is driven by means of one and single spring. The working end of the spring is directly engaged with the sub-mirror supporting member so that the sub-mirror can be moved from the position for observation to the position for photographing and vice versa depending upon only the biasing force of the spring and it can be held in the respective positions by the force of the spring independently of the main mirror. The direction of biasing force applied to the sub-mirror by the spring is changed over in the course of movement from one position to the other through engagement of the fork portion of a lever with a stationary member. Therefore, the arrangement of the sub-mirror driving apparatus according to the invention is very simple in structure and need not to be manufactured with high precision which in turn permits increased productivity of the apparatus.

Obviously many modifications and variations of the present invention are possible in the light of the above teachings. It is therefore to be understood that within the scope of the appended claim, the invention may be practiced otherwise than as specifically described.

What I claim is:

1. In a single lens reflex camera of the type which includes:

a housing;

finder optical system;

a photosensitive element for receiving the light transmitted through a photographing lens of said camera;

a first supporting member one end of which is supported swing movably about an axis within said housing;

a main mirror having a light transmitting portion formed therein, said main mirror being supported by said first supporting member for movement between a first position and a second position with the swing movement of said first supporting member so that in the first position said main mirror reflects the photographing light transmitted through the photographing lens toward the finder optical system and in the second position said main mirror does not reflect said photographing light and blocks the inverse incident light coming from said finder optical system;

a second supporting member mounted on said first supporting member swing movably about an axis; and a sub-mirror mounted on said second supporting member and being movable between a third position and a fourth position with the swing movement of said second supporting member so that in the third position said sub-mirror reflects the photographing light transmitted through said light transmitting portion of the main mirror toward said photosensitive element and in the fourth position said sub-mirror blocks the inverse incident light transmitted through the finder optical system and said light transmitting portion and does not reflect said photographing light, the improvement comprising:

a spring supported by said housing;

a stationary member provided within said housing;

a spring anchoring part formed integrally with said second supporting member and being biased by the working end of said spring for transmitting said biasing force to said sub-mirror, said spring anchoring part being disposed on said second supporting member in such manner that when said main mirror is in the first position it biases said sub-mirror to the third position, when said main mirror is in the second position it biases said sub-mirror to the fourth position and when said sub-mirror is in a particular position between said third and fourth positions, the direction of biasing force is reversed; and a branched part formed integrally with said second supporting member and comprising first and second branches opposed to each other so that said stationary member may be present between and apart from the first and second branches, said first and second branches remain out of contact with said stationary member when said sub-mirror is in the third position and in the fourth position, said first branch comes into contact with said stationary member at the initial step of movement of said main mirror from the first position to the second one so that said sub-mirror is moved from the third position to said particular position with a further movement of said main mirror against the biasing force of said spring thereby reversing the direction of the biasing force of said spring at said particular position, and said second branch comes into contact with said stationary member at the initial step of movement of said main mirror from the second position to the first one so that said sub-mirror is moved from the fourth position to said particular position with a further movement of said main mirror against the biasing force of said spring thereby reversing the direction of the biasing force of said spring.

* * * * *

UNITED STATES PATENT AND TRADEMARK OFFICE
CERTIFICATE OF CORRECTION

PATENT NO. : 4,320,945

DATED : March 23, 1982

INVENTOR(S) : MAKOTO KIMURA

It is certified that error appears in the above—identified patent and that said Letters Patent is hereby corrected as shown below:

Column 3, line 1, after "one" insert --end--.

Column 5, line 63, "and single spring" should read --spring only--.

Signed and Sealed this

Twenty-ninth Day of June 1982

[SEAL]

Attest:

Attesting Officer

GERALD J. MOSSINGHOFF

Commissioner of Patents and Trademarks